Figure 1:
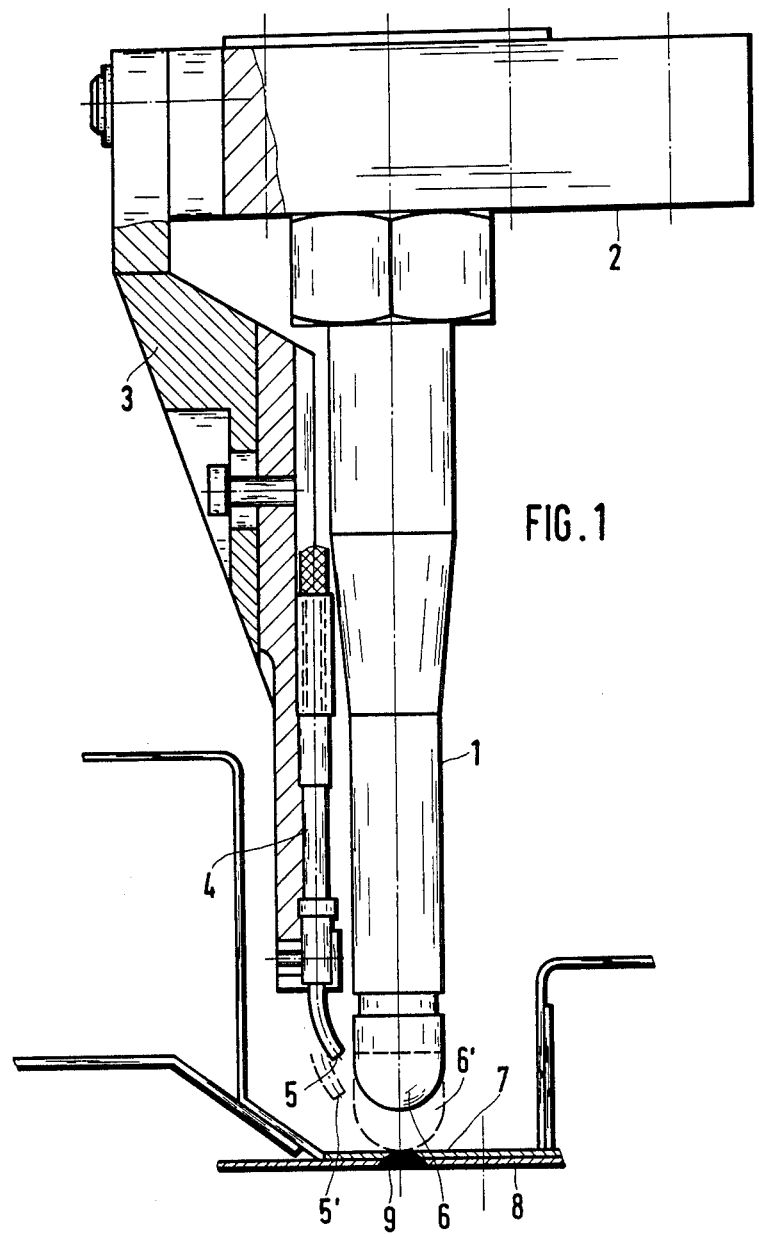

United States Patent [19]

Heinzel

[11] Patent Number: 4,782,230
[45] Date of Patent: Nov. 1, 1988

[54] ARRANGEMENT FOR THE QUALITY TESTING OF A RESISTANCE WELDED CONNECTION

[75] Inventor: Wilfried Heinzel, Unterfoehring, Fed. Rep. of Germany

[73] Assignee: Bayerische Motoren Werke AG, Munich, Fed. Rep. of Germany

[21] Appl. No.: 879,631

[22] Filed: Jun. 27, 1986

[30] Foreign Application Priority Data

Jun. 28, 1985 [DE] Fed. Rep. of Germany ....... 3523112

[51] Int. Cl.[4] .......................... G01J 1/00; G21C 11/00
[52] U.S. Cl. ................................. 250/338.1; 250/342; 250/515.1
[58] Field of Search ................. 250/338 R, 342, 515.1

[56] References Cited

U.S. PATENT DOCUMENTS

| 2,899,563 | 8/1959 | Stellmacher et al. | 250/515.1 |
| 3,191,441 | 6/1965 | Erickson | 250/338 |
| 4,168,430 | 9/1979 | Denis et al. | 250/338 |
| 4,214,164 | 7/1980 | Traub et al. | 250/338 |
| 4,408,827 | 10/1983 | Guthrie et al. | 250/338 |

FOREIGN PATENT DOCUMENTS 2949418  5/1975  Fed. Rep. of Germany .

Primary Examiner—Janice A. Howell
Attorney, Agent, or Firm—Barnes & Thornburg

[57] ABSTRACT

An arrangement for quality testing a resistance welded connection in which a radiation detector is directed onto a welding place and receives the emitted radiation; the inlet opening of the radiation detector is at least approximately completely covered off during the welding operation, properly speaking, and is freed after termination of the welding operation. A protection of the radiation detector against weld spatterings is achieved therewith.

5 Claims, 2 Drawing Sheets

ARRANGEMENT FOR THE QUALITY TESTING OF A RESISTANCE WELDED CONNECTION

The present invention relates to an arrangement for the quality testing of a resistance-welded connection in which a radiation detector is directed toward a welding place and receives the emitted radiation.

In an arrangement of this type, there exist two problems which are closely connected with one another. On the one hand, it is necessary to arrange the radiation detector as close as possible to the welding place because the emitted radiation intensity is anyhow low and decreases rapidly after termination of the welding operation. However, the difficulty results therefrom that the radiation detector is increasingly exposed to welding sputterings which at least partially close its inlet opening and render the same increasingly ineffective.

A proposal can be found in connection therewith from the non-published DE No. 34 00 996-A1 to protect the radiation detector, respectively, its inlet opening against weld spatterings by a protection device. However, any indication concerning the constructive realization of such a protective device cannot be found from this DE No. 34 00 996-A1. However, in this connection means are known in the form of coatings for preventing weld spatterings from sticking to surfaces, by means of which the adhesive forces for the weld spatterings are reduce (compare DE-AS No. 24 10 197 and DE-AS No. 19 34 638). However, if one were to provide the inlet opening of the radiation detector with such a coating, then the received radiation would be further weakened in its intensity with the consequence that the quality testing would lead to a completely unsatisfactory result.

The present invention is concerned with the task to provide an arrangement of the aforementioned type in which it is possible by constructively simple means to arrange the radiation detector as close as possible to the welding place without, however, exposing the same to welding spatterings. The underlying problems are solved according to the present invention in that the inlet opening of the radiation detector is at least approximately completely covered off during the welding operation, properly speaking, and is released after termination thereof.

It is possible by the measures of covering and releasing the inlet opening of the radiation detector which take place in conjunction with the welding operation, to arrange the radiation detector very close to the welding place. Its dimensions can thus be kept very small. It is then possible to provide the inlet opening with a size which corresponds to the welding place to be examined. The radiation detector then no longer is of any great importance by reason of its mass which is to be kept small and without difficulties can be displaced together with the electrode or the electrode support from welding place to welding place (during the spot welding process) or along a welding seam. It is also possible thereby to neglect impairment of the freedom of movement of the welding electrode. The completion of a welding electrode by the arrangement of an associated radiation detector therefore involves no additional programming work for the movement course of the welding electrode.

The constructive means by which the covering and release of the inlet opening of the radiation detector is achieved can be of various construction. Thus, it is possible to bring, in addition to the electrode, a separate shielding device into the optical connection between the radiation detector and the welding place which, upon removal of the electrode from the welding place, is removed out of this connection. In contrast thereto, a constructive, particularly advantageous realization is obtained in that the inlet opening of the radiation detector is arranged and directed (aligned) in such a manner that it is covered off by the welding electrode itself and upon removal thereof from the welding place, is located in the optical path or connection with this welding place. In this case, a separate shielding device can be dispensed with. The welding electrode itself takes over the additional function to cover off the inlet opening of the radiation detector during the welding operation.

The cyclic relationship between welding electrode, welding place and inlet opening of the radiation detector can be realized in various ways. Thus, the radiation detector can be rigidly connected with the welding electrode and can travel with the latter toward the welding place. During the welding operation, properly speaking, the inlet opening is covered off by the welding electrode. After termination of the welding operation, the welding electrode moves away from the welding place, as a result of which an optical connection is formed between the welding place and the inlet opening of the radiation detector.

In the alternative, the welding electrode can be adapted to be movable relative to the radiation detector with respect to the welding place. The optical connection between welding place and inlet opening which exist prior to and after the welding operation, is interrupted during the welding operation by the welding electrode.

Figure 2:
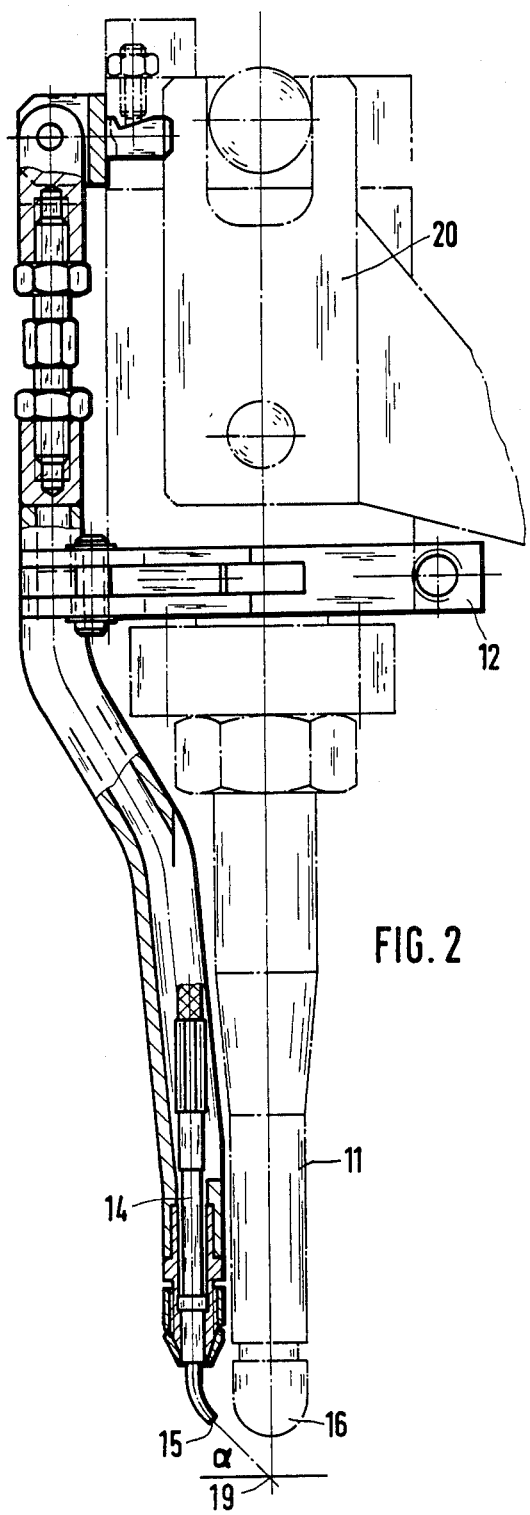

These and other objects, features and advantages of the present invention will become more apparent from the following description when taken in connection with the accompanying drawing which shows, for purposes of illustration only, two embodiments in accordance with the present invention, and wherein:

FIG. 1 is a somewhat schematic elevational view of a first embodiment of an arrangement for the quality testing of a resistance welding connection in accordance with the present invention; and FIG. 2 is a somewhat schematic elevational view of a modified embodiment of an arrangement for the quality testing of a resistance welded connection in accordance with the present invention.

Referring now to the drawing, and more particularly to the embodiment of FIG. 1, a welding electrode 1 is disposed in this embodiment at a mounting support 2 which is part of a conventional welding robot (not illustrated). A light fiber-optical device 4 of conventional construction is secured at the mounting support 2 by way of a support member 3; the inlet opening 5 of the light fiber-optical device 4 is arranged laterally above the cap 6 of the electrode 1. Infrared radiation entering the inlet opening 5 reaches by way of the light fiber-optics 4, a radiation converter (also not illustrated) whose output signals represent a measure for the radiation intensity entering the inlet opening and therewith for the quality of an examined welding point or spot. The quality determination can take place by comparison of the measured radiation intensity with a reference value.

For establishing a welded connection between two sheet metal parts 7 and 8, the electrode 1 together with its cap 6 is displaced toward a welding place 9 and the welding operation is carried out. The light fiber-optical device 4, which moves together with the electrode 1, is so arranged and directed that during the welding operation during which the cap 6 assumes the position 6' shown in dash lines, it is protected by the cap 6 itself against weld spatterings which emanate from the welding place 9. The inlet opening 5 is thereby at the location 5'.

After termination of the welding operation, the electrode 1 lifts off from the welding place 9. As a result therof, the alignment of the inlet opening 5 with respect to the welding place 9 changes, on the one hand, and the cap 6 releases the "view" of the inlet opening 5 onto the welding place 9, on the other. The radiation coming from the welding place 9 preferably in the form of infrared radiation can now reach the inlet opening 5 and therewith the radiation converter by way of the light fiber-optics 4. The quality testing of the welded connection can thus be undertaken directly after termination of the welding operation. The inlet opening 5 always remains protected against weld spatterings also during longer periods of use. The quality testing of welded connections can thus be undertaken over the same time interval of use without any further measures.

In the embodiment according to FIG. 2, the welding electrode 11 is movable relative to the mounting support 12. A corresponding light fiber-optical device 14 together with its inlet opening 15 is secured at the mounting support 12. For carrying out a welding operation, the electrode 11 is displaced by a common movement together with the mounting support 12 to a point a short distance above the provided welding place 19. The inlet opening 15 of the light fiber-optics 14 is thereby directed toward the welding place 19. The electrode 11 is now moved relative to the fixed mounting support 12 toward the welding place 19 by a cylinder 20. The cap 16 of the electrode thereby slides into the optical connection between inlet opening 15 and welding place 19 and interrupts this connection. Weld spatterings which come from the welding place 19 then can no longer reach the inlet opening 15 because the cap 16 shields this inlet opening 15. After termination of the welding operation, the electrode 11 is lifted off from the welding place 19. The inlet opening 15 which still remains at the same location, thereby again receives an optical connection with the welding place 19 and now can receive the radiation emitted therefrom. Also in this case the electrode 11 protects the inlet opening 15 during the welding operation against weld spatterings.

While I have shown and described only two embodiments in accordance with the present invention, it is understood that the same is not limited thereto, but is susceptible of numerous changes and modifications as known to those skidded in the art, and I therefore do not wish to be limited to the details shown and described herein but intend to cover all such changes and modifications as are encompassed by the scope of the appended claims.

I claim:

1. An arrangement for quality testing a resistance welded connection, comprising a radiation detector means having an inlet opening directed onto a welding place for receiving emitted radiation from said welding place, and protection means for arranging and directing said inlet opening with respect to said welding place to be covered by said welding electrode means during a welding operation and to be exposed and in optical connection with the welding place upon removal of the wlding electrode means from the welding place after termination of the welding operation.

2. An arrangement according to claim 1, wherein said welding electrode means is displaceable orthogonal to said welding place to and from said welding operation.

3. An arrangement according to claim 1, wherein the radiation detector means is rigidly connected with the welding electrode means.

4. An arrangement according to claim 1, wherein the welding electrode means is displaceable relative to the radiation detector means.

5. An arrangement for quality testing a resistance welded connection, comprising a radiation detector means having an inlet opening directed onto a welding place for receiving emitted radiation from said welding place, and protection means for automatically covering said inlet opening with respect to said welding place during a welding operation and automatically exposing said inlet opening to said welding place after termination of the welding operation.

* * * * *